United States Patent
James

(10) Patent No.: US 10,711,634 B2
(45) Date of Patent: Jul. 14, 2020

(54) AUTONOMOUS ENGINE HEALTH MANAGEMENT SYSTEM

(71) Applicant: United Technologies Corporation, Farmington, CT (US)

(72) Inventor: Denman H. James, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 266 days.

(21) Appl. No.: 15/795,831

(22) Filed: Oct. 27, 2017

(65) Prior Publication Data

US 2018/0058257 A1 Mar. 1, 2018

Related U.S. Application Data

(63) Continuation of application No. 14/921,429, filed on Oct. 23, 2015, now Pat. No. 9,885,250.

(51) Int. Cl.
*F01D 21/00* (2006.01)
*F02C 7/26* (2006.01)
*F02C 3/04* (2006.01)
*F02C 7/06* (2006.01)
*F02D 41/26* (2006.01)

(52) U.S. Cl.
CPC .............. *F01D 21/003* (2013.01); *F02C 3/04* (2013.01); *F02C 7/06* (2013.01); *F02C 7/26* (2013.01); *F02D 41/26* (2013.01); *F05D 2260/80* (2013.01); *F05D 2260/85* (2013.01); *F05D 2270/301* (2013.01); *F05D 2270/304* (2013.01)

(58) Field of Classification Search
CPC .. F01D 21/003; F02C 3/04; F02C 7/06; F02C 7/26; F02D 41/26; F05D 2260/80; F05D 2260/85; F05D 2270/301; F05D 2270/304
USPC ......................................................... 701/100
See application file for complete search history.

(56) References Cited

U.S. PATENT DOCUMENTS

| | | | |
|---|---|---|---|
| 5,365,048 A | 10/1994 | Geiser | |
| 5,685,396 A | 11/1997 | Elkin et al. | |
| 5,748,500 A | 5/1998 | Quentin et al. | |
| 6,126,569 A * | 10/2000 | Genise | B60W 10/06 477/91 |

(Continued)

FOREIGN PATENT DOCUMENTS

| | | |
|---|---|---|
| CA | 2874449 | 6/2015 |
| CN | 1647911 | 8/2005 |

(Continued)

OTHER PUBLICATIONS

Christian et al., "Condition based monitoring for industrial engines," Year: 2012, Conference Paper.*

(Continued)

*Primary Examiner* — Tuan C To
(74) *Attorney, Agent, or Firm* — Carlson, Gaskey & Olds, P.C.

(57) ABSTRACT

An engine health monitoring system includes an engine component having a sensor system configured to monitor at least one parameter of the component. An autonomous monitoring system is coupled to the sensor system and is configured to receive and store the at least one monitored parameter while an engine controller is unpowered. The engine controller is communicatively coupled to the autonomous monitoring system.

12 Claims, 3 Drawing Sheets

(56) References Cited

U.S. PATENT DOCUMENTS

| | | | |
|---|---|---|---|
| 6,186,925 B1 * | 2/2001 | Bellinger | B60W 10/02 |
| | | | 192/103 C |
| 6,907,445 B2 | 6/2005 | Pellegrino et al. | |
| 7,681,402 B2 | 3/2010 | Champion et al. | |
| 8,099,227 B2 | 1/2012 | Shafique et al. | |
| 8,538,658 B2 | 9/2013 | Duke et al. | |
| 8,672,095 B2 | 3/2014 | Charier et al. | |
| 9,046,002 B2 | 6/2015 | Homeyer | |
| 9,238,461 B1 * | 1/2016 | Liu | B60L 15/20 |
| 2005/0017876 A1 * | 1/2005 | Ziarno | B64D 29/00 |
| | | | 340/945 |
| 2005/0096873 A1 * | 5/2005 | Klein | G01H 1/006 |
| | | | 702/184 |
| 2005/0213548 A1 * | 9/2005 | Benson | G01D 21/00 |
| | | | 370/338 |
| 2006/0047403 A1 | 3/2006 | Volponi et al. | |
| 2007/0234734 A1 | 10/2007 | Uluyol et al. | |
| 2009/0235630 A1 | 9/2009 | Norris | |
| 2009/0287400 A1 * | 11/2009 | Pursifull | F02D 41/009 |
| | | | 701/113 |
| 2010/0107603 A1 | 5/2010 | Smith | |
| 2011/0178648 A1 * | 7/2011 | Calvignac | F01D 15/10 |
| | | | 700/291 |
| 2012/0077633 A1 * | 3/2012 | Mueller | B60K 6/365 |
| | | | 475/5 |
| 2013/0091855 A1 | 4/2013 | Race | |
| 2013/0158838 A1 | 6/2013 | Yorke et al. | |
| 2013/0204468 A1 * | 8/2013 | Camhi | G06F 17/00 |
| | | | 701/3 |
| 2013/0213344 A1 | 8/2013 | Stender | |
| 2013/0291835 A1 | 11/2013 | Imamura et al. | |
| 2013/0332011 A1 * | 12/2013 | Ziarno | G05B 23/0213 |
| | | | 701/3 |
| 2014/0214286 A1 * | 7/2014 | Chandran | G06F 17/00 |
| | | | 701/51 |
| 2014/0271114 A1 | 9/2014 | Phillips et al. | |
| 2014/0379242 A1 | 12/2014 | Henein et al. | |
| 2015/0005990 A1 * | 1/2015 | Burns | B64D 31/14 |
| | | | 701/3 |
| 2015/0027412 A1 | 1/2015 | Henson | |
| 2015/0168264 A1 | 6/2015 | Proctor | |
| 2015/0185111 A1 | 7/2015 | Armstrong et al. | |
| 2015/0283996 A1 * | 10/2015 | Wang | B60K 6/547 |
| | | | 477/3 |
| 2015/0338854 A1 * | 11/2015 | Atkins | G05D 1/0077 |
| | | | 701/3 |
| 2016/0061173 A1 | 3/2016 | Chuah et al. | |
| 2016/0125053 A1 * | 5/2016 | Willson | G06F 16/219 |
| | | | 707/746 |
| 2016/0160679 A1 * | 6/2016 | Griffiths | B08B 3/003 |
| | | | 134/57 R |
| 2016/0273379 A1 * | 9/2016 | Soares, Jr. | G05B 23/0254 |
| 2016/0288779 A1 * | 10/2016 | Kotloski | F16H 3/728 |
| 2016/0288780 A1 * | 10/2016 | Shukla | B60W 20/10 |
| 2016/0368612 A1 * | 12/2016 | Xiong | B64D 27/16 |
| 2017/0102308 A1 | 4/2017 | Gillette, II et al. | |
| 2017/0161963 A1 * | 6/2017 | Green | G07C 5/004 |
| 2017/0176993 A1 | 6/2017 | Kato et al. | |

FOREIGN PATENT DOCUMENTS

| | | | |
|---|---|---|---|
| EP | 1873358 | 1/2008 | |
| FR | 2942001 A1 * | 8/2010 | F02C 7/26 |
| KR | 20130090849 A * | 8/2013 | G07C 5/0816 |
| KR | 20130139475 | 12/2013 | |
| WO | 2010092080 | 8/2010 | |

OTHER PUBLICATIONS

Yeonho et al., "Development and control of an electric oil pump for automatic transmission-based hybrid electric vehicle," Year: 2011, vol. 60, pp. 1981-1990.

Mustafa et al., "Monitoring of actuation conditions in a micro-turbo-generator," Year: 2013, vol. 13, pp. 2937-2943.

European Search Report for Application No. 16195162.9 dated Mar. 1, 2017.

* cited by examiner

AUTONOMOUS ENGINE HEALTH MANAGEMENT SYSTEM

CROSS-REFERENCE TO RELATED APPLICATION

This application is a continuation of U.S. application Ser. No. 14/921,429 filed Oct. 23, 2015.

TECHNICAL FIELD

The present disclosure relates generally to turbine engine health management, and more specifically to an autonomous monitoring system for the same.

BACKGROUND

Gas turbine engines, such as those used in commercial and military aircraft, include multiple moving components. In order to prevent damage to the moving components a lubricant and coolant, such as oil, is provided to the moving components. In some example engines, the components can be subjected to wind milling, or other motion, while the engine is off. If insufficient lubrication is provided to the moving components while the engine is off, the engine can sustain damage in a manner that is not readily apparent until a failure mode is exhibited during operation.

Monitoring systems incorporated into the engine controller, such as a Full Authority Digital Engine Controller (FADEC), monitor the operation of the moving components while the engine is on. However, typical engine controllers draw power from onboard power generation and power down when the aircraft is not in operation. As the engine controller is powered down while the engine is not in operation in these examples, the engine controller is incapable of monitoring the moving components or the lubrication systems while the engine is powered down.

SUMMARY OF THE INVENTION

In one exemplary embodiment an engine health monitoring system includes an engine component including a sensor system configured to monitor at least one parameter of the component, an autonomous monitoring system coupled to the sensor system and configured to receive and store the at least one monitored parameter while an engine controller is unpowered, and the engine controller is communicatively coupled to the autonomous monitoring system.

In another exemplary embodiment of the above described engine health monitoring system, the autonomous monitoring system includes a power source configured to provide operational power to the autonomous monitoring system.

In another exemplary embodiment of any of the above described engine health monitoring systems, the power source is connected to an on-board generator of an aircraft.

In another exemplary embodiment of any of the above described engine health monitoring systems, the power source includes an input configured to be connected to a ground based power supply.

In another exemplary embodiment of any of the above described engine health monitoring systems, the sensor system is communicatively coupled to the engine controller.

In another exemplary embodiment of any of the above described engine health monitoring systems, the engine component includes a bearing oil supply, and the sensor system includes an inlet pressure sensor.

In another exemplary embodiment of any of the above described engine health monitoring systems, the sensor system includes an ambient pressure sensor.

In another exemplary embodiment of any of the above described engine health monitoring systems, the inlet pressure sensor and the ambient pressure sensor are the same sensor.

In another exemplary embodiment of any of the above described engine health monitoring systems, the engine component includes a shaft and the sensor system includes a rotational speed sensor configured to detect a rotational speed of the shaft.

In another exemplary embodiment of any of the above described engine health monitoring systems, the autonomous sensor system includes a local memory, a local processor and a local power storage device, the local processor being configured to receive sensor data from the sensor system, correlate the received sensor data with a time at which the sensor data was generated, and store the sensor data in the local memory.

In another exemplary embodiment of any of the above described engine health monitoring systems, the local processor is further configured to pre-process the received sensor data and determine the occurrence of potentially damaging conditions.

In another exemplary embodiment of any of the above described engine health monitoring systems, the autonomous sensor system is further configured to communicate stored sensor data to the engine controller during an engine initialization.

An exemplary method of monitoring the health of a gas turbine engine includes sensing at least one of an inlet oil pressure and a shaft speed while a gas turbine engine is off, storing the sensed values of the at least one of an inlet oil pressure and a shaft speed in a local memory of an autonomous monitoring system, and reporting the stored sensed values of the at least one of the inlet oil pressure and the shaft speed to an engine controller during an engine initialization.

Another example of the above described method of monitoring the health of a gas turbine engine further includes analyzing the reported stored sensed values using the engine controller during an initialization of the engine, and halting the initialization of the engine in response to a determination that at least one component operated in a potentially damaging condition based on the sensed values.

Another example of any of the above described methods of monitoring the health of a gas turbine engine further includes the engine controller determining that a shaft operated in a potentially damaging condition in response to a sensed rotational shaft speed exceeding a maximum threshold while the engine is off.

Another example of any of the above described methods of monitoring the health of a gas turbine engine further includes the engine controller determining that a shaft operated in a potentially damaging condition in response to a sensed inlet oil pressure falling below a minimum threshold while the engine is off.

Another example of any of the above described methods of monitoring the health of a gas turbine engine further includes charging a local power storage device of the autonomous monitoring system while the engine is operating.

Another example of any of the above described methods of monitoring the health of a gas turbine engine further includes correlating the stored sensed values of the at least one of an inlet oil pressure and a shaft speed with a time at which the value was sensed using a local processor of the autonomous monitoring system, and storing the time correlation in the local memory.

Another example of any of the above described methods of monitoring the health of a gas turbine engine includes reporting the stored sensed values of the at least one of the inlet oil pressure and the shaft speed to the engine controller during an engine initialization further includes reporting the time correlated to the engine controller.

These and other features of the present invention can be best understood from the following specification and drawings, the following of which is a brief description.

DETAILED DESCRIPTION OF AN EMBODIMENT

Figure 1:
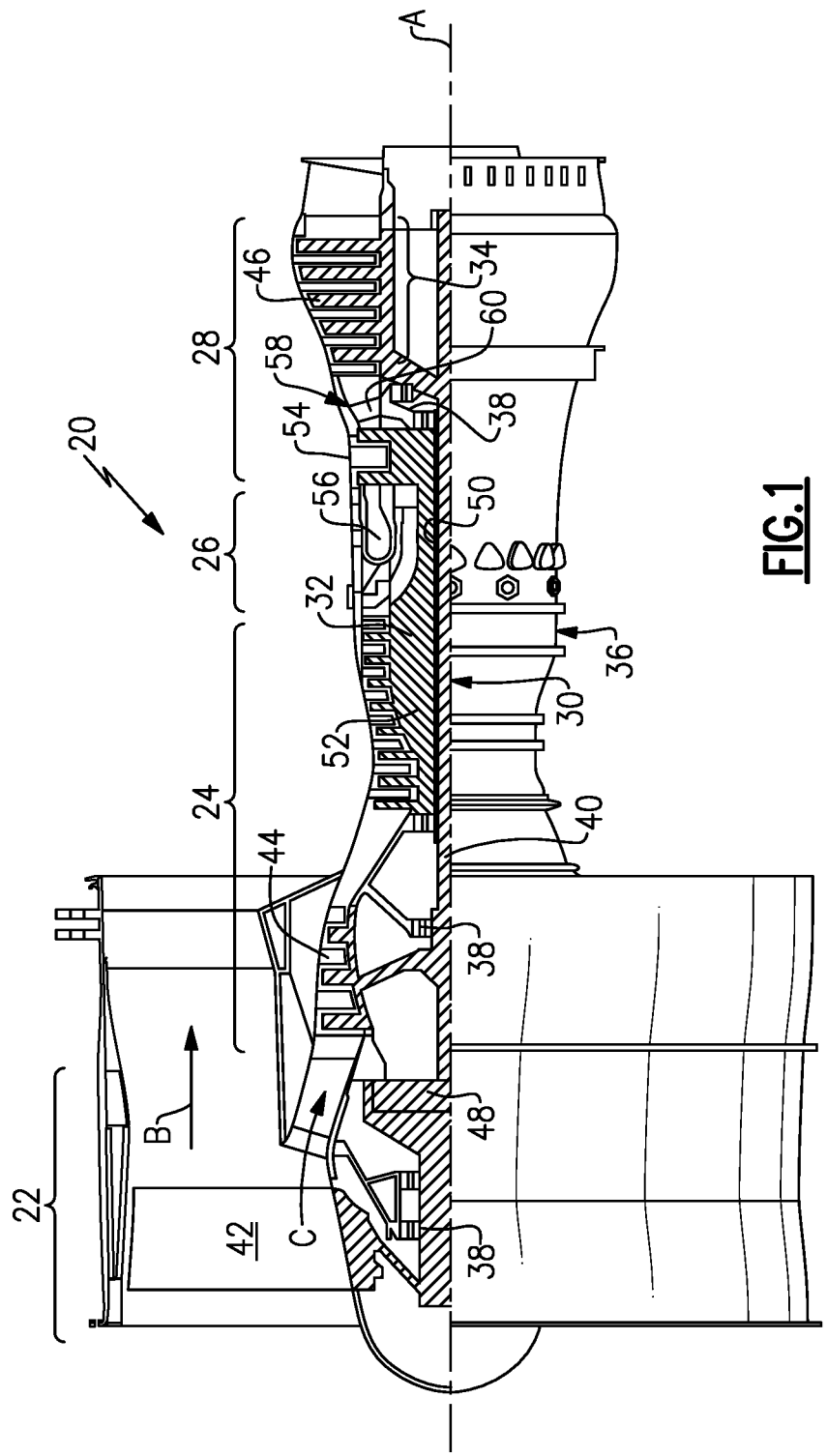
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. It should be further understood that some or all of the following concepts can be applied to gas turbine engines other than geared turbofan based engines with minimal or no modifications.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. Alternative engine types, such as direct drive engines can omit the fan drive gear system 48 entirely, and connect the fan 42 directly to one of the low speed spool 30 and the high speed spool 32.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are exemplary of one embodiment of a geared architecture engine and that the present invention is applicable to other gas turbine engine architecture including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (1066.8 meters). The flight condition of 0.8 Mach and 35,000 ft (1066.8 m), with the engine at its best fuel consumption—also known as "bucket cruise Thrust Specific Fuel Consumption ('TSFC')"— is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/s).

Certain components within the gas turbine engine, such as journal bearings or other bearing types, require lubrication or cooling any time the component moves. Movement of the component without adequate lubrication or cooling can result in damage that is not detected until the engine 10 enters a failure mode during operation. Further, certain of these components are connected to the fan 42 either through a gearing system or directly. When an aircraft is not in operation, but is positioned outside, environmental conditions such as wind can cause the fan 42 to rotate. This rotation is referred to as wind milling. Due to its connection to one or more shafts within the engine, when the fan begins wind milling, components within the engine are rotated.

In order to monitor the engine systems, and detect conditions that could lead to hidden damage within the engine systems, an autonomous monitoring system is incorporated in the engine 20.

Figure 2:
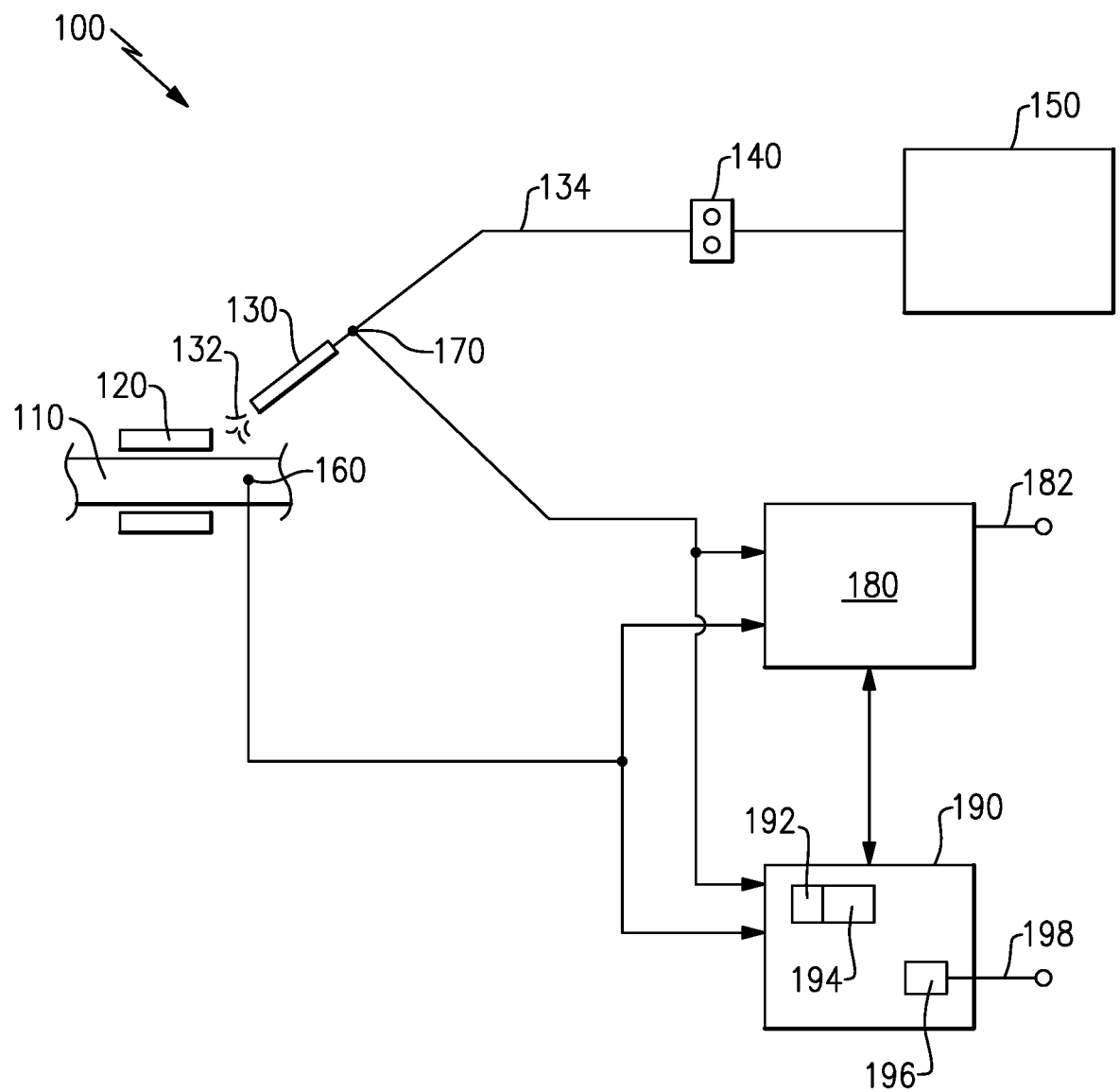
FIG. 2 schematically illustrates an exemplary autonomous monitoring system for a gas turbine engine.

FIG. 2 schematically illustrates an exemplary engine health monitoring system 100 that is capable of monitoring for wind milling and monitoring engine systems during wind milling while the engine is in an off state. Included within the gas turbine engine systems is a shaft 110. The shaft 110 is supported by one or more bearings 120. In some examples, the bearings 120 are journal bearings. In alternative examples, alternative bearing types may be utilized in place of, or in addition to, journal bearings. Rotation of the shaft at speeds in excess of an maximum speed threshold while the engine is off can result in undetected damage and cause the engine to enter a failure mode during operation of the gas turbine engine.

An oil based lubricant is provided to the bearings 120 from an oil inlet 130. In some examples, the oil can be provided as a spray 132. In alternative examples, such as with journal bearings, alternative oil delivery means or mechanisms can be utilized to the same effect depending on the physical construction of the bearing 120 and the gas turbine engine 20. Oil is provided to the oil inlet 130 via an oil line 134 connected to a pump 140. The pump 140 is in turn connected to an oil supply 150, and draws oil from the supply 150. The pump 140 maintains a threshold inlet oil pressure at the inlet 130. As long as the oil inlet pressure stays at, or above, the threshold inlet oil pressure, the shaft 110 can rotate within the bearing 120 without causing damage to the bearing 120 or the shaft 110. Rotation of the shaft while the oil inlet pressure is below the threshold can cause undetected damage that can result in the engine entering a failure mode during standard operations.

The exemplary engine health monitoring system 100 includes a shaft speed sensor 160 connected to the shaft 110 and capable of detecting a rotational speed of the shaft 110. Also included is an inlet oil pressure sensor 170 capable of detecting the pressure at the oil inlet 130. In some examples, the inlet oil pressure sensor 170 is also capable of detecting an ambient atmospheric pressure at or near the oil inlet 130. While illustrated and described herein as individual sensors 160, 170, one of skill in the art will understand that each of the sensors 160, 170 can be a network of individual sensors configured to cooperatively determine a corresponding sensed parameter or parameters.

During operation of the engine 20, data from each of the sensors 160, 170 is provided to an engine controller 180. The engine controller 180 can be a full authority digital engine controller (FADEC) or any other type of engine controller. The engine controller 180 also includes a power input 182 connected to an on-board power supply of the gas turbine engine. In some examples, the on board power supply is a generator configured to generate electrical power utilizing the rotation of the shaft within the gas turbine engine.

Due to being receiving power from on board power supply, the engine controller 180 does not operate while the engine is shut down. As the controller 180 is not operating, the controller 180 cannot receive and monitor sensor values from the sensors 160, 170 and the engine controller 180 cannot detect the occurrence of wind milling. Similarly, the controller 180 cannot detect the occurrence of potentially damaging conditions or events that occur as the result of wind milling.

The engine health monitoring system 100 also includes an autonomous sensor system 190. The autonomous sensor system 190 includes a local memory 192 and a local processor 194. Also included within the autonomous sensor system 190 is a power storage device 196. The power storage device 196 includes an input 198 connected to the same on board power supply and the power input 182 of the engine controller 180. In alternative examples, the input 198 is connected to an alternative on board power generation system. In yet further alternative examples, the input 198 can be connected to a ground based power supply via a standard power supply interface.

In examples using the ground based power supply, the power storage device 196 can be omitted and the autonomous sensor system 190 can be powered directly from the ground based power supply.

As the autonomous sensor system 190 has operational power from the power storage element 196, the autonomous sensor system 190 is capable of monitoring data from the sensors 160, 170 while the engine is off. Data from the sensors 60, 170 is time correlated by the local processor 194 and stored in the local memory 192 of the autonomous sensor system 190. When the engine is turned on again, power is provided to the engine controller 180, and the engine controller 180 begins engine initialization.

As a part of the engine initialization process, the controller 180 retrieves the stored data from the autonomous sensor system 190. The controller 180 can then analyze the data and determine if any wind milling or potentially damaging events occurred during the period in which the engine was off. If any of these events occurred, the controller 180 can respond in a pre-defined manner. In some examples, when the controller 180 determines that a potentially damaging event occurred, the controller 180 stops initialization of the engine entirely, and sends an error message indicating that the engine must undergo maintenance before the engine can be initialized.

In some examples, the above described analysis can be performed in whole or in part at the local processor 194 within the autonomous sensor system 190. In these examples, the local processor 194 then creates a log of events to be reviewed by the engine controller 180 during initialization. In this way the length initialization process of the engine can be reduced as the engine controller 180 only considers a limited amount of data.

In further examples, the engine controller 180 can analyze the data during initialization for gaps indicating that the autonomous sensor system 190 was unpowered or otherwise unable to monitor the sensors 160, 170 for a time period while the engine was off. If the engine controller 180 detects such a time period, the engine controller 180 can determine if the gap exceeds a minimum time threshold. If the minimum time threshold is exceeded, the engine controller 180 can refuse to initialize the engine until after maintenance has occurred.

Figure 3:
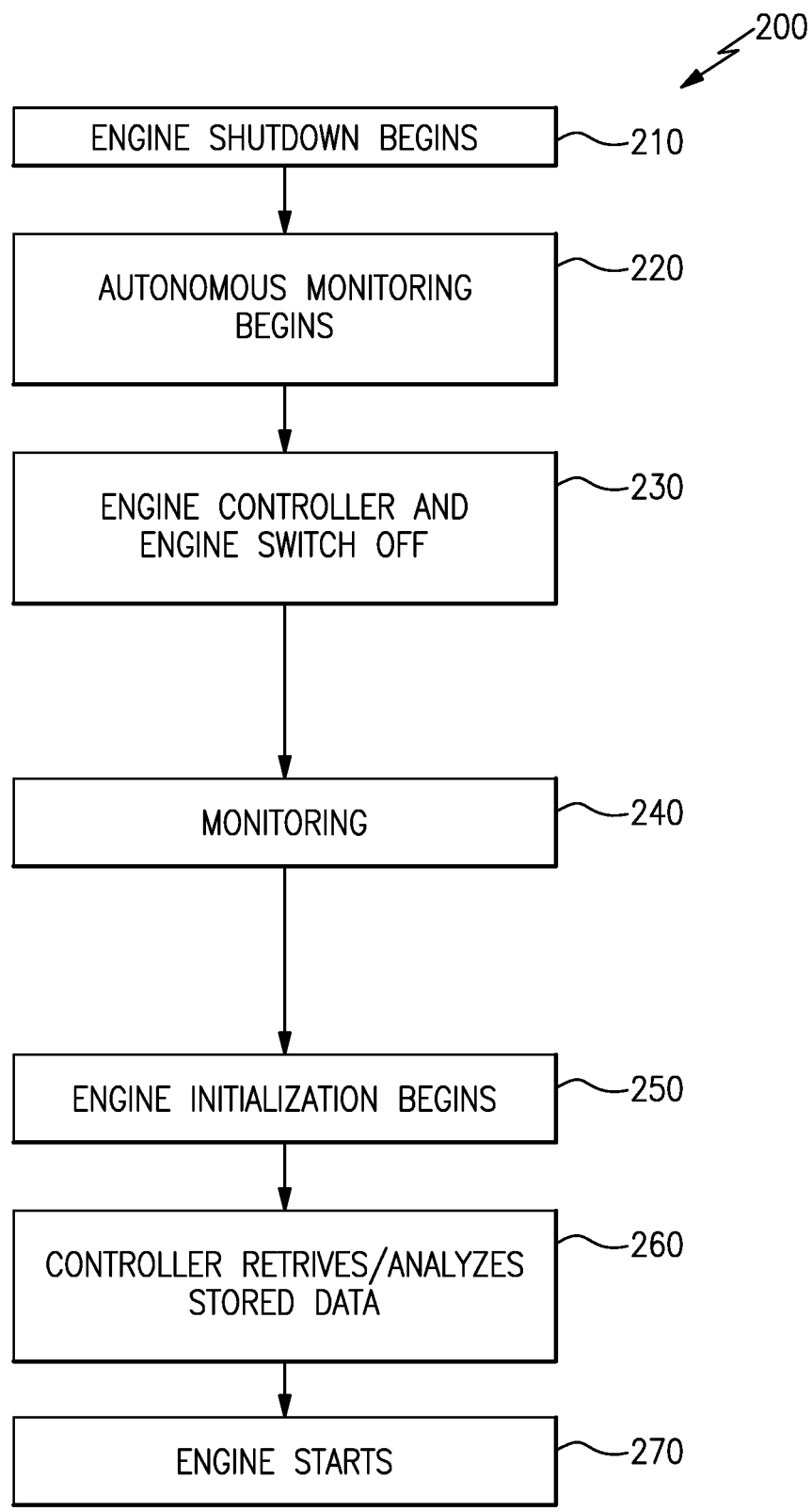
FIG. 3 illustrates an autonomous monitoring process of an exemplary gas turbine engine.

With continued reference to FIG. 2, FIG. 3 illustrates a method for operating the engine health monitoring system 100 of FIG. 2. Initially, the engine controller 180 begins an engine shutdown sequence at an "Engine Shutdown Begins" step 210. Prior to the engine controller being turned off, and the engine ceasing operations, The engine controller 180 signals the autonomous sensor system 190 to begin operating. Upon receipt of the signal, the autonomous sensor system 190 begins monitoring in an "Autonomous Monitoring Begins" step 220.

Once the engine controller 180 confirms that the autonomous monitoring system 190 has begun monitoring the outputs of the sensors 160, 170. The engine controller 180 switches the engine off, and the controller 180 itself switches off in an "Engine Controller and Engine Switch Off" step 230.

The autonomous monitoring system 190 continues monitoring the sensor outputs in a "monitoring" step 240. In some examples, the monitoring includes gathering of raw data and correlating the raw data with a time stamp. In other examples, the monitoring further includes comparing the raw data to one or more preconfigured thresholds to determine the occurrence of a potentially hazardous event using the local processor 194. When such an event is detected, the occurrence is logged in a log file including a start time and an end time of the event. The log file is stored in the local memory 192 until the engine controller 180 requests the log file in a later step.

In some examples, the aircraft including the engine 20 can be parked for days or weeks at a time. The autonomous monitoring system 190 continues to monitor in the monitoring step 240 for the full duration of the off time.

When a user, such as a pilot, wishes to engage the engine, the engine controller 180 begins initialization of the engine in an "Engine Initialization Begins" step 250. The engine initialization includes a powering on of the engine controller 180. The engine controller 180 then engages in pre-flight checks to ensure that all engine systems are functional prior to starting the engine.

During the pre-flight checks, the engine controller 180 queries the autonomous sensor system 190 for sensed data that occurred during the off time. In response to the query, the autonomous sensor system 190 provides the engine controller 180 with the stored data. In examples where the autonomous sensor system 190 stores raw data, the raw data is provided to the engine controller 180, along with a time correlation, and the engine controller 180 analyzes the raw data to determine if any potentially damaging conditions occurred. By way of non-limiting example, potentially damaging conditions that could be detected include an oil inlet pressure falling below a minimum threshold value, and a shaft rotational speed exceeding a maximum value. When such an event is detected, the engine controller 180 can determine that the engine should undergo maintenance before being operated, and the initialization sequence provides an error to the operator and stops.

In alternative examples, the autonomous sensor system 190 pre-analyzes the data using a local processor 194, and the engine controller 180 is provided with data relevant only to potentially damaging conditions. In such an example, the engine initialization time is reduced due to the decreased analysis required to be performed during the initialization.

In yet further examples, the engine controller 180 can analyze the data from the autonomous sensor system 190 to determine if there are any time periods during the shutdown where data was not gathered from the sensors 160, 170 for at least a minimum time period. If there are any such time periods, or gaps, the engine controller 180 can determine that the autonomous sensor system 190 was unable to monitor the system for the duration, and that the engine should undergo maintenance before being operated.

After the data has been fully analyzed, and the remainder of the initialization sequence has been completed, the engine begins operating, and the autonomous monitoring system 190 ceases operations in an "Engine Starts" step 270. While the engine is operating, the power input to the power storage device 196 provides power to the power storage device 196, and the power storage device 196 is charged up to full power.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An engine health monitoring system comprising:
    an engine component including a sensor system configured to monitor at least one parameter of the component while an engine including the engine component is in an off state;
    an autonomous monitoring system coupled to the sensor system and configured to receive and store the at least one monitored parameter while an engine controller is unpowered; and
    the engine controller is communicatively coupled to the autonomous monitoring system.

2. The engine health monitoring system of claim 1, wherein the autonomous monitoring system includes a power source configured to provide operational power to the autonomous monitoring system.

3. The engine health monitoring system of claim 2, wherein the power source is connected to an on-board generator of an aircraft.

4. The engine health monitoring system of claim 2, wherein the power source includes an input configured to be connected to a ground based power supply.

5. The engine health monitoring system of claim 1, wherein the sensor system is communicatively coupled to the engine controller.

6. The engine health monitoring system of claim 1, wherein the engine component includes a bearing oil supply, and the sensor system includes an inlet pressure sensor.

7. The engine health monitoring system of claim 6, wherein the sensor system includes an ambient pressure sensor.

8. The engine health monitoring system of claim 7, wherein the inlet pressure sensor and the ambient pressure sensor are the same sensor.

9. The engine health monitoring system of claim 1, wherein the engine component includes a shaft and the sensor system includes a rotational speed sensor configured to detect a rotational speed of the shaft.

10. The engine health monitoring system of claim 1, wherein the autonomous monitoring system includes a local memory, a local processor and a local power storage device, the local processor being configured to:
    receive sensor data from the sensor system;
    correlate the received sensor data with a time at which the sensor data was generated; and
    store the sensor data in the local memory.

11. The engine health monitoring system of claim 10, wherein the local processor is further configured to pre-process the received sensor data and determine the occurrence of potentially damaging conditions.

12. The engine health monitoring system of claim 10, wherein the autonomous sensor system is further configured to communicate stored sensor data to the engine controller during an engine initialization.

* * * * *